March 18, 1952  C. W. SKARSTROM  2,589,971
APPARATUS FOR DETERMINING FLAME BLOWOUT IN JET ENGINES
Filed June 16, 1949  9 Sheets-Sheet 1

March 18, 1952     C. W. SKARSTROM     2,589,971
APPARATUS FOR DETERMINING FLAME BLOWOUT IN JET ENGINES
Filed June 16, 1949     9 Sheets-Sheet 6

Charles W. Skarstrom    Inventor
By W.O.J Helmer Attorney

March 18, 1952 — C. W. SKARSTROM — 2,589,971
APPARATUS FOR DETERMINING FLAME BLOWOUT IN JET ENGINES
Filed June 16, 1949 — 9 Sheets-Sheet 7

Charles W. Skarstrom, Inventor
By W. O. ?Heilman, Attorney

Patented Mar. 18, 1952

2,589,971

UNITED STATES PATENT OFFICE 2,589,971

APPARATUS FOR DETERMINING FLAME BLOWOUT IN JET ENGINES

Charles W. Skarstrom, Hazlet, N. J., assignor to Standard Oil Development Company, a corporation of Delaware Application June 16, 1949, Serial No. 99,462

2 Claims. (Cl. 73—119)

1

The present invention is concerned with a method for anticipating and preventing flame blow-out in jet-turbine engines. The invention is more particularly concerned with a method and apparatus for indicating closeness of approach to flame blow-out under all conditions of altitudes or thrust utilizing measurement of gaseous temperature rise due to combustion, and measurement of ratio between absolute combustor static pressure to air weight flow through the combustor. In accordance with the present invention a method is disclosed for indicating continuously the relative values of the temperature rise due to combustion, hereinafter referred to as delta-T, and the ratio of combustor static pressure to the weight rate of air flow in the combustion chamber of a jet engine. These values are suitably calibrated for each installation and provide a gauge of the proximity of flame extinction at all times while the engine is in operation.

The problem of flame blow-out is one of the most critical in the operation of jet engines. Heretofore, no generalization has been available for predicting the limits of operating conditions irrespective of altitude or thrust at which this phenomena would be encountered. Although flame blow-out occurs in the combustors of jet engines at all altitudes, it occurs to a greater degree at high altitudes, for example at 30,000 feet and above. Although present instruments are available which warn the pilot of approaching flame blow-out they do not operate and are not reliable over a wide range of thrust and altitude. In addition, present day automatic control devices to insure continuous burning unnecessarily restrict the burner operating range and hence limit the maximum attainable altitude and thrust. One object of the present invention is to attain an improved flame blow-out indicator which is reliable over the widest range of thrust and altitude for which the jet engine is capable. Through the use of the present invention maximum operating ranges inherent in the fuel and burner combination can be realized in a jet-turbine engine.

The invention may be more readily understood by reference to the drawings and sketches illustrating the same. Figure 1 illustrates a typical schematic sketch of a combustor in a jet-turbine type engine.

Figure 2:
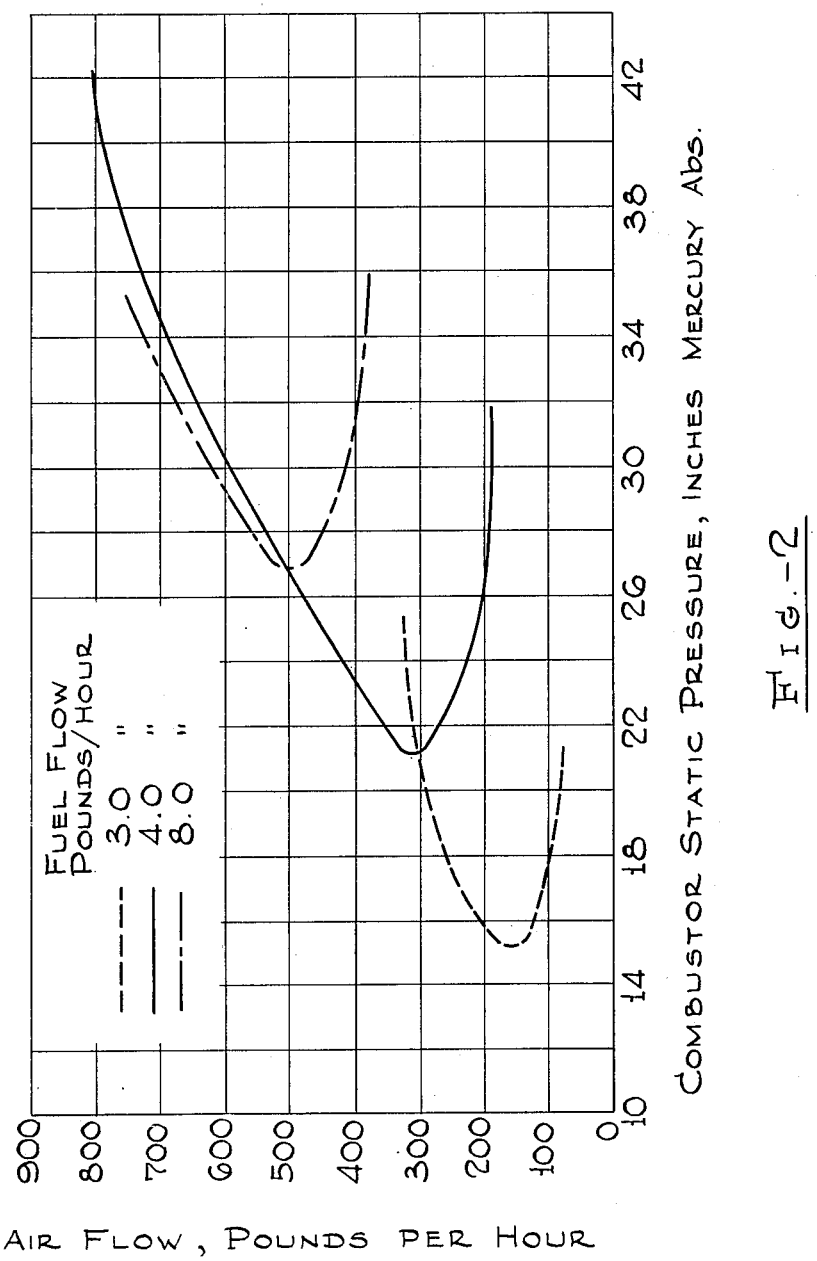
Figure 2 illustrates the relationship at flame blow-out between combustor static pressure and air flow (lbs. per hour) for various fuel flows in lbs. per hour when using a particular fuel. The region of steady burning is within the envelopes as shown.
Figure 4:
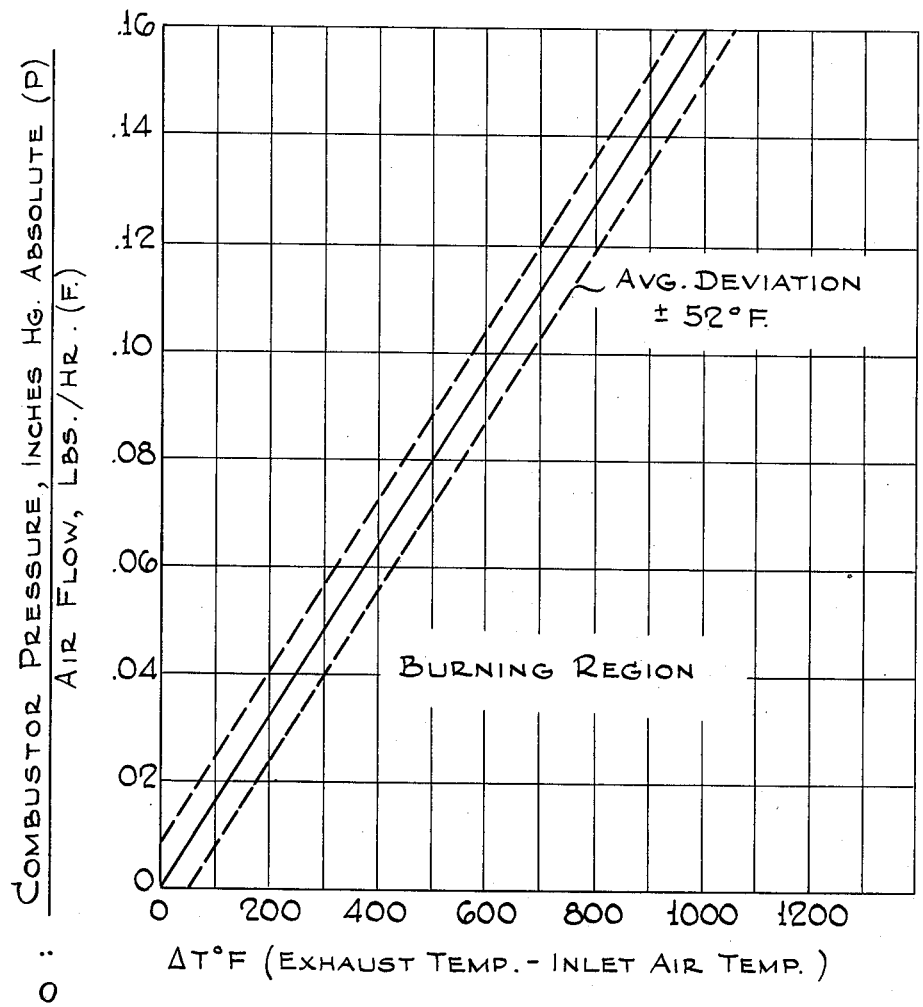

Figure 4 illustrates the straight line relationship which exists at flame blow-out between the ratio of the combustor pressure (P) over air flow (F) against the temperature differential ($\Delta T$) between the inlet air and exhaust gases of the combustor when utilizing a fuel as specified in connection with Figure 2. The region of steady burning is to the right of the straight line. The dotted lines represent deviations observed in the experimental data.

Figure 3:
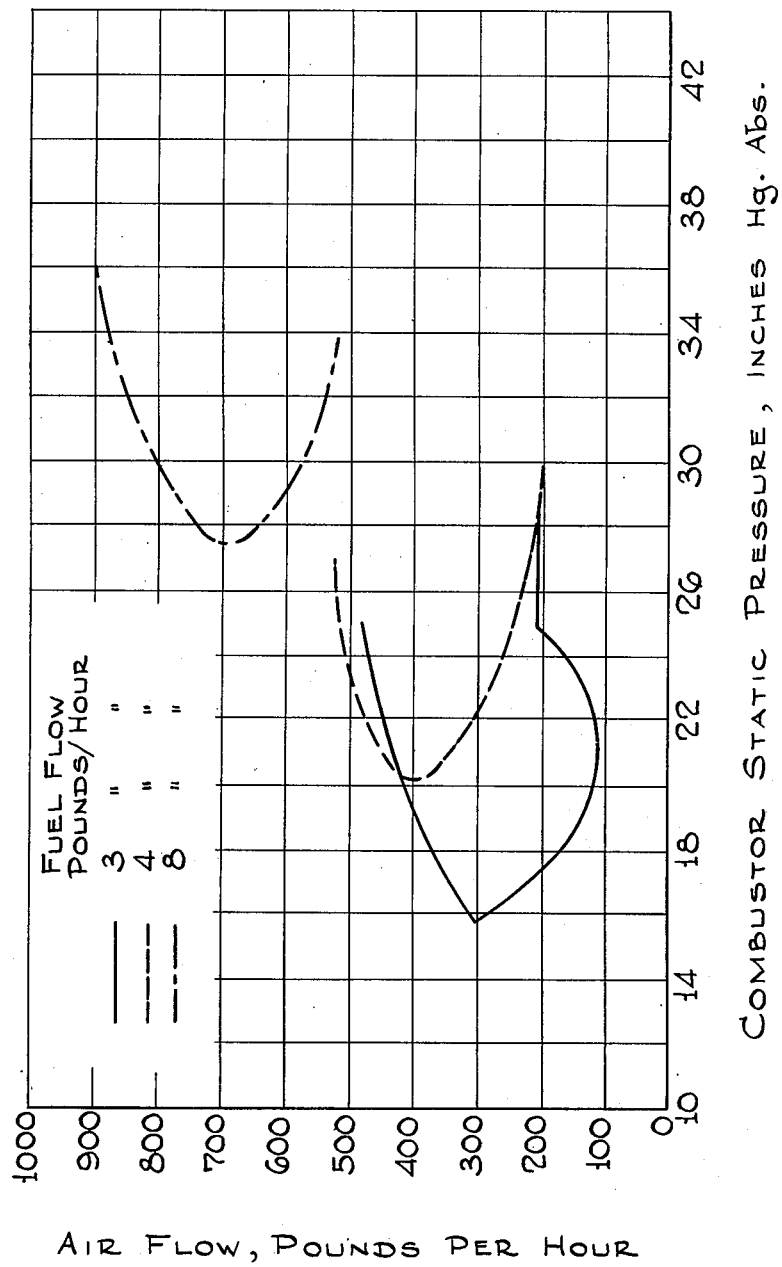
Figure 3 illustrates a similar relationship as shown by Figure 2 except with respect to a different fuel composition.
Figure 5:
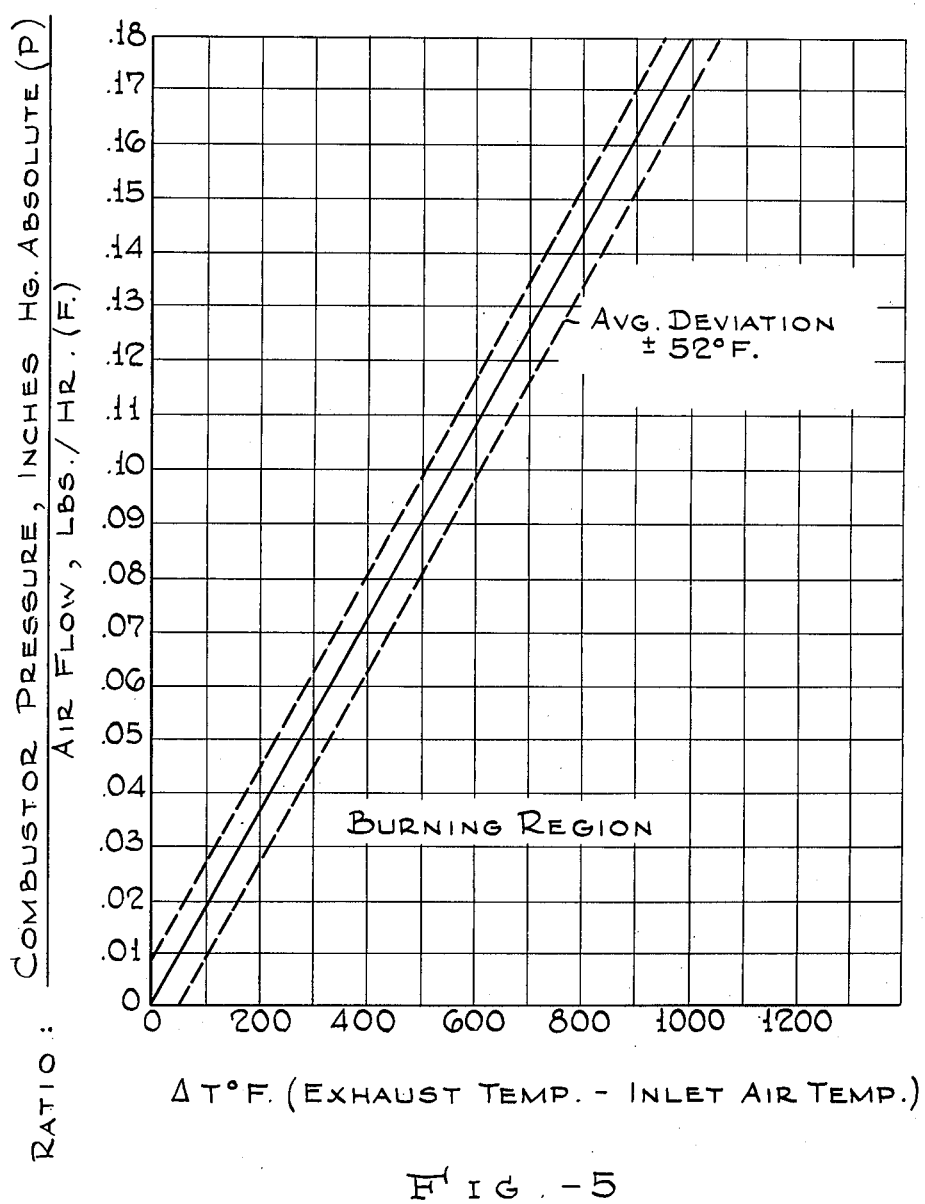

Figure 5 illustrates the straight line relationship which exists at flame blow-out between the ratio of the combustor pressure over air flow against the temperature differential between the inlet air and exhaust gases when utilizing a fuel as specified in connection with Figure 3. The region of steady burning is to the right of the straight line. The dotted lines indicate variations of the observed experimental data.

Figure 6:
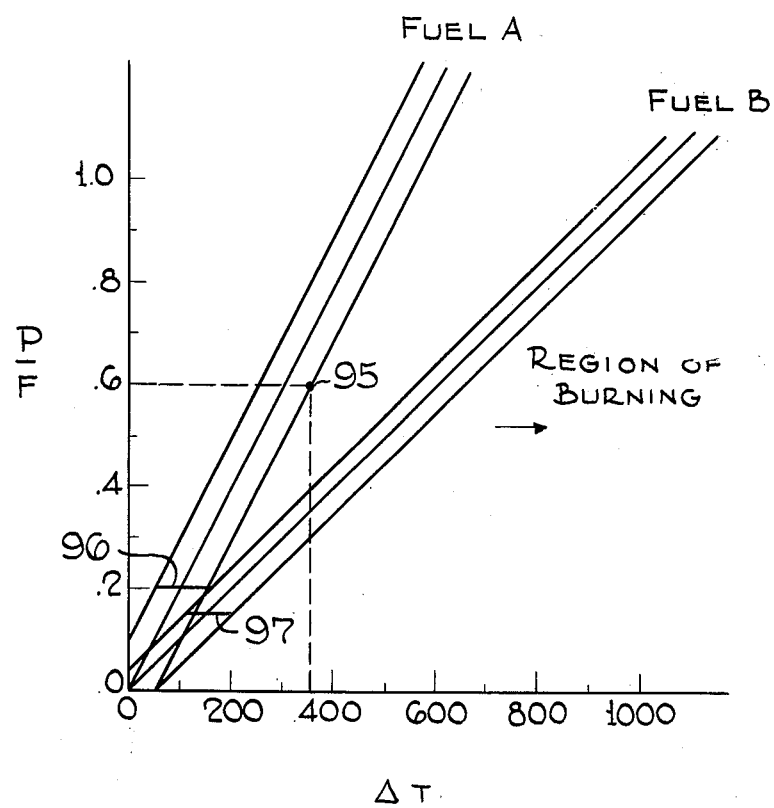

Figure 6 is similar to Figures 4 and 5 and shows the variance with respect to the use of different hypothetical fuels.

Figure 7:
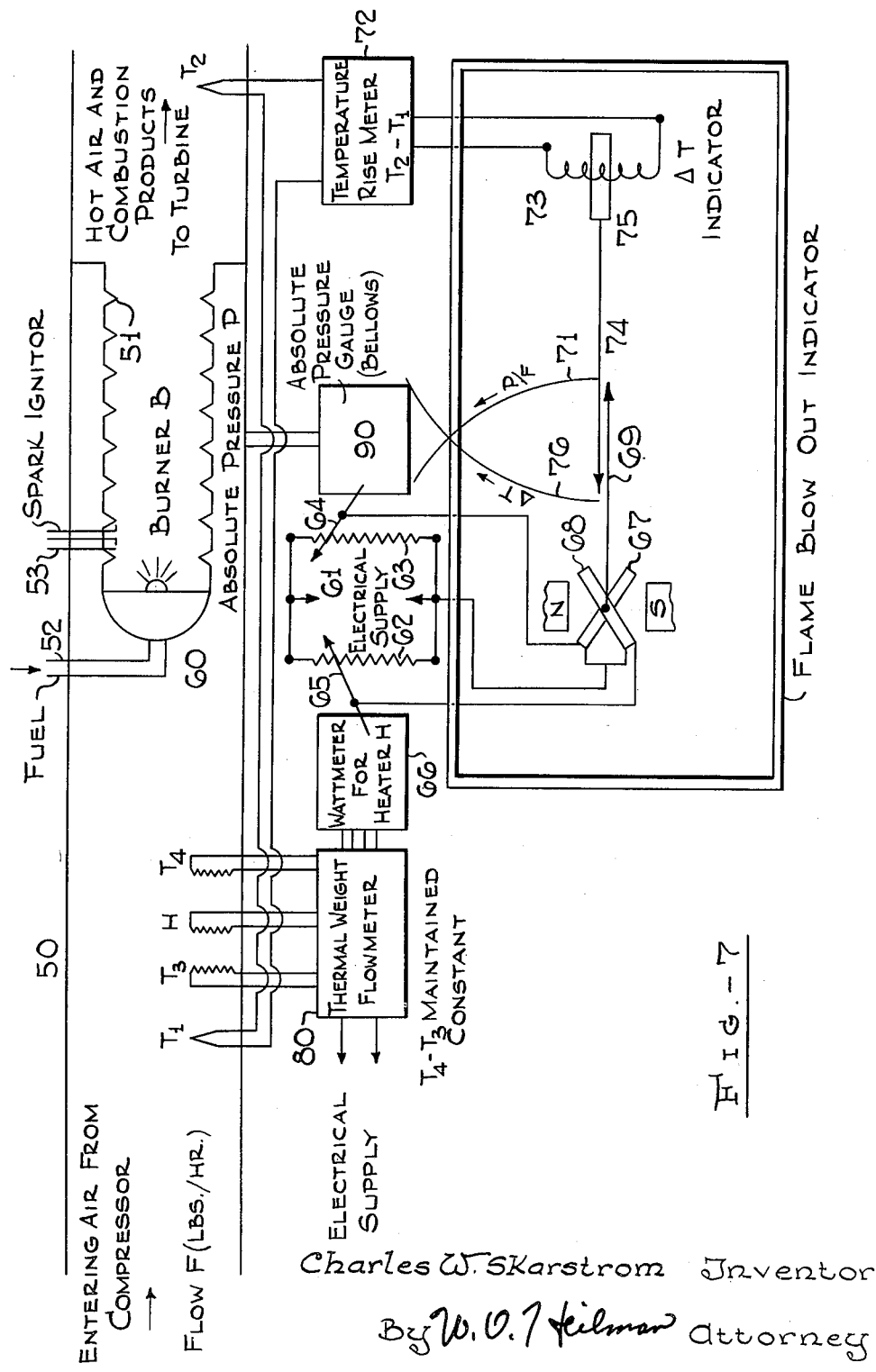

Figure 7 is a schematic sketch showing the method of application of the present invention.

Figure 8:
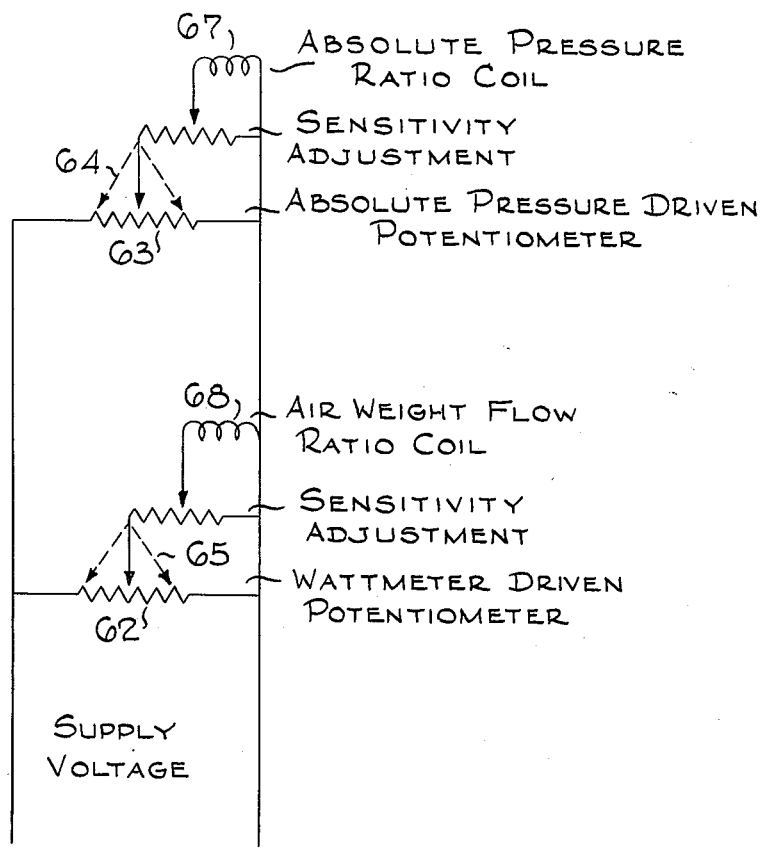

Figure 8 represents the details of the connections to the ratio meter together with methods for adjusting the sensitivity thereof.

Figure 9:
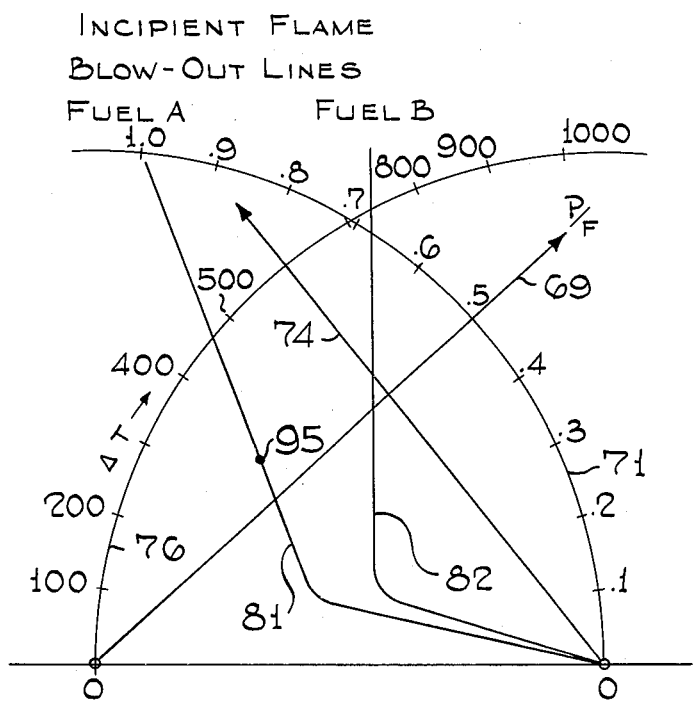

Figure 9 is a schematic drawing of the face of the blow-out indicator as observed by the pilot.

Figure 1:
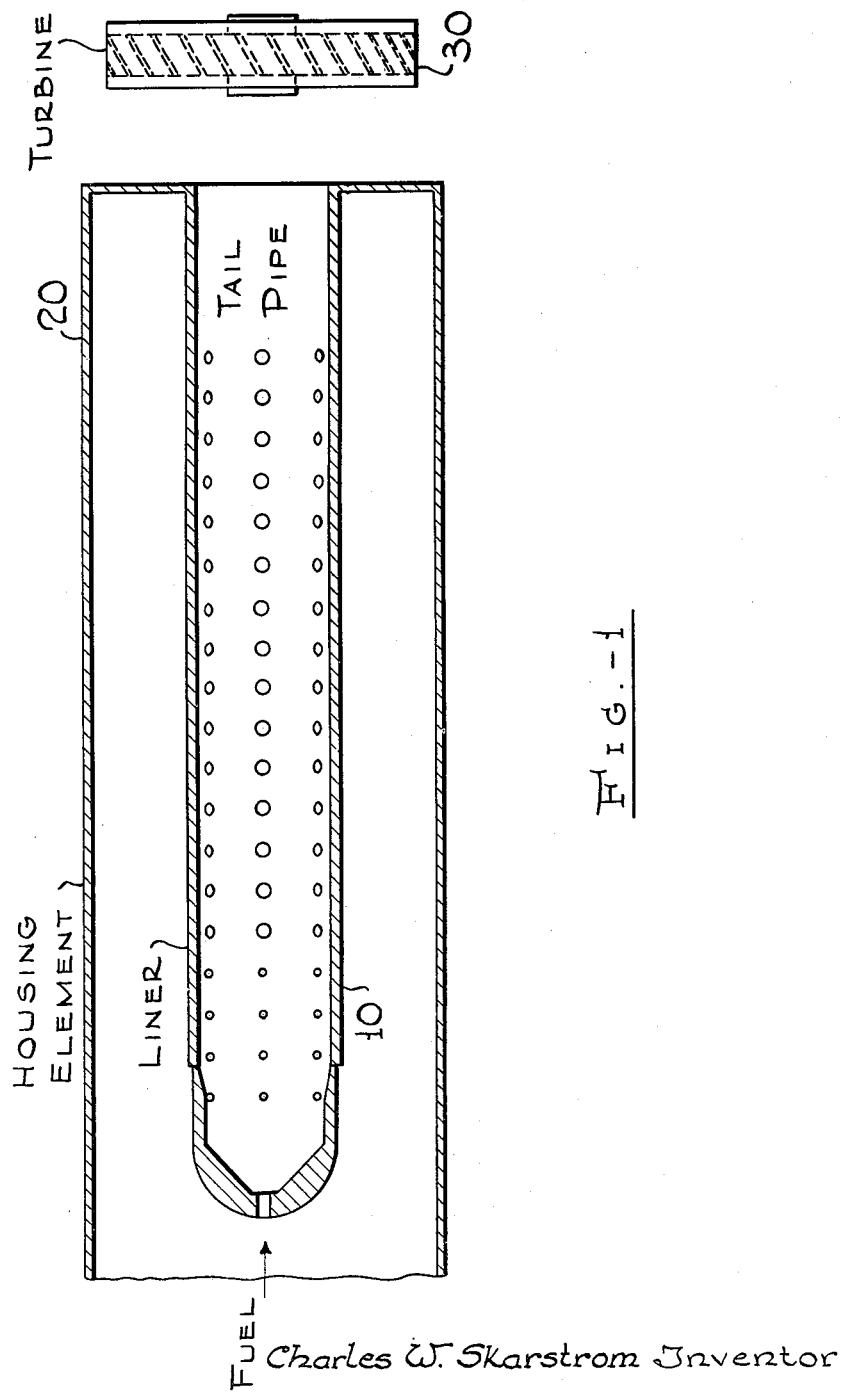

Referring specifically to Figure 1, fuel is sprayed through an appropriate nozzle into liner element 10 which contains an appropriate number of varied dimensioned ports. Liner element 10 is suitably housed in housing element 20. In a conventional manner air or an oxygen-containing gas flows from the housing element through the ports into the liner wherein combustion occurs. Hot combustion gases flow through the tail-pipe and exert a forward thrust. The hot combustion gases impinge on turbine element 30 rotating the same which in turn functions to supply the air or oxygen-containing gas in sufficient amount and sufficient pressure to the area between the housing element and the liner. It is to be understood that any number of combustors may be utilized in parallel or in series or in combinations thereof. It is also to be understood that the oxygen-containing gas may be in part recycled gas or gas from a previous partial combustion, and that the term air as used herein includes such gases. The combustors may be arranged in a manner so that the exhaust gases from each combustor impinge only on a section of the turbine element. Another modification is to combine the exhaust gases from a plurality of combustors and to impinge the total gases on a turbine element. The invention also applies to "afterburner" combustors placed in the tail cone after the turbine. It is to be understood that although in Figure 1 the air is shown as entering from the nozzle end of the combustor, the air may be introduced from the opposite end and flow in a countercurrent manner with respect to the combustor gases thus preheating the incoming air.

Referring specifically to Figure 2 it is evident that there exists a distinct relationship between the combustor static pressure, the air flow and fuel flow rates wherein blow-out will and will not occur. The region of steady burning is within the envelopes as shown. It can be seen that the regions of satisfactory burning are determined by the fuel flow as measured in lbs. per hour. It thus can be seen that there exists only limited areas common to different fuel flows which provide satisfactory burning conditions. Since conventional blow-out indicating and control instruments are designed based upon various fuel flow rates, it is apparent that the burning conditions must of necessity be very restricted. The kerosene type fuel composition used in determining the relationship illustrated in Figure 2 had the following inspections:

Gravity, °API _____ 42.8
Refractive index (Na. D. Light) @ 20° C. _ 1.447
Copper dish gum, mg./100 cc _____ 0.6
Heating value, B.t.u./lb. (net) _____ 18,540

Distillation ASTM Engler:

IBP, °F _____ 322
10% at °F _____ 349
50% at °F _____ 385
90% at °F _____ 457
FBP, °F _____ 505

Figure 3 illustrates relationships similar to those described with respect to Figure 2 except that a different fuel was employed, which fuel had the following inspections:

Aviation gasoline fuel:

ASTM aviation octane No _____ 80
Gravity, °API _____ 67.8
RVP, p. s. i _____ 5.0
Refractive index @ 20° C _____ 1.3970
Copper dish gum, mg./100 cc _____ 3.9
Heating value, B.t.u./lb. (net) _____ 18,983

Distillation ASTM Engler:

IBP, °F _____ 113
10% at °F _____ 147
50% at °F _____ 184
90% at °F _____ 257
FBP, °F _____ 373

Referring specifically to Figure 4 it is evident that a straight line relationship exists between the ratio of combustor pressure and air flow as compared to the delta-T between the inlet air temperature and the temperature of the exhaust gases. As pointed out heretofore, the dotted lines indicate the average deviation observed in experimental data. The straight line relationship shown in Figure 4 is secured when burning the kerosene type fuel, the envelopes of burning of which are plotted on Figure 2. The envelopes of burning for the kerosene type fuel for different fuel rates as shown in Figure 2, are transformed into a single envelope which comprises the region to the right of the straight line shown in Figure 4. It is to be noted that the relationship illustrated on Figure 4 is independent of fuel rate with respect to a particular fuel. Instead, a temperature rise measurement between the inlet and exhaust gases is employed. The discovery of this relationship, shown in Figure 4, and its utilization comprise the essence of the present invention.

Figure 5 illustrates a relationship entirely similar to that illustrated with respect to Figure 4 except an aviation type fuel is utilized. The aviation type fuel is the one upon which the envelopes shown in Figure 3 are based. Thus, it is apparent that the linear relationship as shown in Figures 4 and 5 holds true for different types of fuels. Different fuels, while not affecting the linear relationship, will merely affect the slopes of the linear relationships in any one combustor.

This difference in slopes secured when using fuels having different characteristics is illustrated by Figure 6.

From the above, in order to carry out the present invention it is apparent that the following measurements must be secured:

(a) A measurement of the absolute static combustor pressure (P).

(b) A measurement of the flow (F) of air in weight units such as lbs. per hour.

(c) A measurement of the ratio of (a) and (b).

(d) A measurement of the inlet air temperature to the combustor.

(e) A measurement of the temperature of the exhaust gases from the combustor.

(f) The temperature difference ($\Delta T$) measured between (d) and (e).

(g) The relationship between (f) and (c) determined. As long as the temperature rise of flowing gases exceeds by a fixed amount a constant multiple of the ratio P/F burning will persist in the major range of burning operating conditions. The fixed amount is equal to or slightly greater than the average deviation of the observed data taken as applying to the temperature rise. The constant multiple is equal to the reciprocal slope of the observed linear relationship.

Figure 7 illustrates a schematic sketch of securing the measurements and relationships enumerated.

The entering air from the compressors enters housing 50 and flows into liner 60 through suitable ports 51. The fuel enters the liner 60 by means of fuel supply line 52. The fuel is ignited by a suitable ignition means 53.

In accordance with the broadest concept of the present invention the weight air flow may be measured by any suitable means. However, it is preferred to measure the weight air flow by a thermal weight flowmeter 80 wherein the temperature differential between T4 and T3 is maintained constant. The instrument operates in a manner that sufficient heat is introduced into the flowing air stream by means of heating coil H so as to maintain the temperature difference between T4 and T3 constant. The quantity of electrical wattage necessary to supply the heat in order to maintain this constant temperature rise is measured and calibrated in order to directly determine the weight of gas flowing per unit interval of time. While, as poined out, any suitable weight flow air recorder may be used, a type operating on the principle of the "Thomas" meter is preferred. This type meter is manufactured by Cutler-Hammer, Inc., Milwaukee, Wisconsin. Its principle of operation is described in the Chemical Engineers Handbook (1941), McGraw-Hill, New York (pages 867–868). A diagrammatic arrangement of the Thomas type calorimetric gas meter and brief details of its operation is given ibid. on page 2046.

The absolute static pressure likewise may be measured by any suitable means; however, it is preferred that the pressure be measured by a bellows type gauge 90.

In order to determine the ratio of the static combustor absolute pressure P to the weight flow of gas F, an electrical system may be used as illustrated in the drawing. This system essentially comprises a potentiometric system from which two electrical signals are obtained, one proportional to the absolute pressure P and the other proportional to the air weight flow F. These two electrical signals are applied to a ratio meter which indicates the ratio of P to F as desired for (c). A suitable source of voltage 61 is positioned across two electrical resistances 62 and 63 arranged in parallel. The needle 64 controlled by the absolute pressure gauge 90 either is caused to move along the resistance 63 or controls the movement of a contact along the resistance 63 so as to control the value of this resistance proportional to the absolute pressure. The movement of this needle determines the voltage applied to coil 67 of the ratio meter. Similar movements of the needle 65 of the wattmeter 66 is used to vary the resistance of 62 by movement of a wattmeter needle along this resistance. The position of needle 65 determines the voltage applied to the coil 68 of the ratio meter. By connecting the tap of resistance 63 or of needle 64 electrically to a coil 67 the other side of which is connected to the electrical supply 61, it is possible to produce a current in coil 67 which is directly proportional to the absolute pressure as indicated by meter 90. Again, by electrically connecting the tap of resistance 62 or of needle 65 to one side of the coil 68, the other side of which is connected to the voltage supply 61, a current will be produced in coil 68 which is directly proportional to the indications of wattmeter 66. Coils 67 and 68 are rigidly attached to each other and are positioned in a magnetic field. A needle movement 69 is attached rigidly to cross coils 67 and 68. As a result, fluctuations in current in coils 67 or 68 will cause the needle 69 to move in a manner to indicate the value of the ratio of the absolute pressure P to the air flow F on scale 71. A suitable ratio meter is a model RA manufactured by the Sensitive Research Instrument Corp., Mount Vernon, N. Y., described in their publication, "Electrical Instruments," volume 13, No. 3, dated March 1946 (page 4).

The temperature difference between the inlet and exhaust gases to the combustor may be secured by any suitable means. However, it is preferred to measure the temperature of the inlet gas by a thermocouple T1 or equivalent means while the temperature of the exhaust gas is measured by thermocouple T2. The temperature rise between T1 and T2 is indicated by temperature rise meter 72. The temperature rise measured by means 72 will control the current flowing through coil 73 which in turn will directly control the position of needle 74 which is moved by an armature 75. Meter 72 may contain suitable adjusting or amplifying means so as to produce the proper current in coil 73. In order that the needle 74 indicates the temperature rise a ranging potentiometer can be placed in shunt with the temperature rise indicator to provide for adjustment of the sensitivity of this part of the apparatus.

Thus, scales 76 and 71 will reflect the temperature rise and the ratio of absolute pressure over weight air flow respectively.

Figure 8 supplements the disclosure of Figure 7. The general hook-up as shown in Figure 8 is for the purpose of adjusting the intensity of the respective signals registered on scale 71. The ratio meter comprises coils 67 and 68 as pointed out heretofore. These two coils receive signals from the pressure-driven potentiometer 63 through the slider 64 and from the wattmeter driven potentiometer 62 through the slider 65. Sensitivity adjustment means are provided in each circuit. Thus, the indication of the ratio meter pointer will therefore measure some multiple of the ratio between the absolute pressure and the weight air flow.

Figure 9 illustrates one adaptation wherein the present invention can be readily utilized. Figure 9 illustrates the face of a meter showing scales 76 and 71, as well as indicator arrows 69 and 74. Engraved upon the area between the respective scales are incipient blow-out lines 81 and 82 which apply respectively to fuel A and fuel B as shown in Figure 6. In operation, for example, if fuel B is being utilized indicating pointers 69 and 74 must always intersect to the right of flame blow-out line 82. On the other hand, if fuel A is being utilized indicating pointers 69 and 74 must always intersect to the right of incipient blow-out line 81.

These incipient blow-out lines are determined in a manner as described heretofore, being transposed from Figure 6 to Figure 9. As pointed out, the position of these lines will be altered depending upon the particular type of jet engine employed, as well as the particular type of fuel being used. Once it is determined that a particular fuel is to be utilized in a particularly designed engine, the engine is run with that particular fuel in test flight and points of blow-out determined as shown on Figures 4 and 5 respectively. Referring specifically to Figure 6, fuel A, it may be seen that P/F equal to 0.6 corresponds to a $\Delta T$ of about 360 at the point 95 on Figure 6. This constitutes a point 95 on flame blow-out line 81, in Figure 9. The remaining points are secured in a similar manner. The points of incipient blow-out, line 82 for fuel B, are similarly determined. As a matter of safety, the incipient blow-out lines inscribed on the scale are so inscribed covering the extreme deviation with respect to non-blow-out. In addition, and as an added feature of precaution to insure continuous burning, the lower ends of the inscribed lines 81 and 82 are drawn to the origin of the $\Delta T$ pointer 74 so as to limit the safe operating range to a minimum temperature rise across the combustor. This corresponds with the short horizontal lines 96 and 97 drawn across the zones of incipient blow-out for fuels A and B in Figure 6, as determined in test flight.

The present invention is broadly concerned with the prevention of blow-out in jet engines. In accordance with the present invention, blow-out is prevented by determining the weight air flow in the jet engine, the combustor pressure and the temperature rise of the flowing gases and the utilization of the relationship between these values. It has been discovered that at blow-out conditions a distinct relationship exists between the temperature rise of the flowing gases and the ratio of the combustor absolute pressure and the weight air flow with respect to areas of incipient blow-out. Based upon this newly discovered relationship, areas of incipient blow-out are determined with respect to any particular fuel and particularly designed jet engine. Having determined these areas of incipient blow-out, blow-out is prevented by so operating the engine to keep away from these areas of incipient blow-out. In other words, these areas or bands of incipient blow-out clearly define conditions under which blow-out will occur and conditions under which blow-out will not occur. Once having established the bands, steps may be readily taken to keep within the areas wherein blow-out will not occur. Thus, as long as the temperature rise of flowing gases exceeds by a fixed amount a constant multiple of the ratio between the absolute pressure in and the air weight flow through the combustor, burning will persist in the major range of burner operating conditions. Although the invention is not to be restricted thereby, it is felt that this relationship is a result of the existence of a minimum incremental volumetric flow through the combustor below which burning is not self-sustained and above which continuous burning is self-maintained.

Specifically, a jet engine is operated under blow-out conditions at which time the weight of air flow is determined, the combustor pressure measured and the temperature rise of the flowing gases also measured. These data are then utilized as described to determine incipient bands at blow-out conditions for a particular fuel used in the engine employed. The engine or similar type of engine, when utilizing similar types of fuels, is then operated under conditions whereby the temperature rise exceeds by a fixed amount a constant multiple of the ratio between the combustor pressure and the weight flow.

The invention may be readily applied in any type of jet engine employing any suitable jet fuel. It is also within the concept of the present invention to determine the blow-out characteristics of new fuels. This is readily accomplished by determining the aforementioned relationships of a new fuel with those of old and commonly used fuels. Thus, fuels proposed for use in jet planes can be evaluated with respect to their blow-out characteristics.

It is also within the concept of the present invention to adjust automatically the factors and conditions of operation so as to maintain operating conditions whereby blow-out will not occur. It is obvious that any means taken to adjust either the absolute combustor pressure, the weight air flow or the temperature rise is within the concept of the present invention. It is within the concept of the present invention, for example, for a fixed weight air flow and a fixed combustor pressure to employ automatic means to increase the fuel rate thereby raising the $\Delta T$ in order to move away from areas of incipient blow-out to regions of satisfactory operation.

Having described the invention it is claimed:

1. Apparatus for determining flame blow-out in a jet engine which comprises a thermal weight flow meter to determine the weight of the incoming air per unit of time, a temperature rise meter to determine the temperature differential across the combustor between the incoming air and the hot combustion gases, an absolute pressure gauge whereby the static pressure of the combustor is measured, electrical means for ratioing the signal received from the thermal weight flow meter and the absolute pressure gauge, an indicator the position of which on a scaled face is determined by said ratio means, a second indicator, the position of which on said scaled face is determined by the signal received from said temperature rise meter, said indicators being so positioned as to intersect on said face, said face being empirically scaled in a manner to sharply define the regions of flame blow-out and sustained flame operation, whereby said indicator means may be caused to intersect in the region of said scaled face of sustained flange.

2. Apparatus for determining flame blow-out in a jet combustor which comprises: a first electrical means to provide a first electrical signal proportional to the weight of the air passing to the combustor per unit of time, a second electrical means to provide a second electrical signal proportional to the absolute combustor pressure, means for ratioing said first and second electrical signals, indicator means associated with said ratioing means exhibiting an indication of said electrical ratio, means for determining the temperature differential between the incoming air and the exhaust gases of the combustor, and a second indicating means exhibiting an indication of said temperature differential, said first and second indicating means being positioned adjacent a common scale and being arranged so as to provide a cooperative indication on said scale, whereby conditions of flame blow-out may be exhibited.

CHARLES W. SKARSTROM.

REFERENCES CITED

The following references are of record in the file of this patent:

UNITED STATES PATENTS

| Number | Name | Date |
| --- | --- | --- |
| 1,282,926 | Packard | Oct. 29, 1918 |
| 1,605,779 | Rissman | Nov. 2, 1926 |
| 2,357,921 | Xenis et al. | Sept. 12, 1944 |